United States Patent
Elkhazin

(10) Patent No.: US 11,405,617 B1
(45) Date of Patent: Aug. 2, 2022

(54) METHOD AND SYSTEM TO ENHANCE COMPRESSION EFFICIENCY IN ENCODED VIDEO BY USING DUAL PASS ENTROPY CODING

(71) Applicant: Xilinx, Inc., San Jose, CA (US)

(72) Inventor: Akrum Elkhazin, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/880,542

(22) Filed: May 21, 2020

Related U.S. Application Data

(60) Provisional application No. 62/850,948, filed on May 21, 2019.

(51) Int. Cl.
| | | |
|---|---|---|
| *H04N 19/13* | (2014.01) | |
| *G06F 17/18* | (2006.01) | |
| *H04N 19/172* | (2014.01) | |
| *H04N 19/146* | (2014.01) | |

(52) U.S. Cl.
CPC .............. *H04N 19/13* (2014.11); *G06F 17/18* (2013.01); *H04N 19/146* (2014.11); *H04N 19/172* (2014.11)

(58) Field of Classification Search
CPC ................................ H04N 19/13; G06F 17/18
See application file for complete search history.

(56) References Cited

U.S. PATENT DOCUMENTS

| | | | | |
|---|---|---|---|---|
| 2007/0223582 | A1* | 9/2007 | Borer | H04N 19/521 |
| | | | | 375/E7.137 |
| 2009/0058691 | A1* | 3/2009 | Koo | H04N 19/107 |
| | | | | 341/51 |
| 2016/0301942 | A1* | 10/2016 | Qiu | H04N 19/423 |
| 2016/0353110 | A1* | 12/2016 | Zhang | H04N 19/126 |

\* cited by examiner

*Primary Examiner* — Jerry T Jean Baptiste
(74) *Attorney, Agent, or Firm* — Goodwin Procter LLP

(57) ABSTRACT

Methods and systems for improving encoding of a picture or a frame are disclosed. According to one embodiment, a method for encoding video frames includes receiving for a frame, several binarized symbols that include a number of bins corresponding to one or more contexts. For each context from one or more contexts, the method includes entropy encoding in a first pass bins associated with the context using an initial probability distribution for the context; generating counts of zeros and ones in a set of bins associated with the context; updating the initial probability distribution using the respective counts of zeros and ones, to obtain an updated probability distribution; and entropy encoding in a second pass the bins associated with the context using the updated probability distribution, to provide at least a part of an encoded bitstream.

24 Claims, 3 Drawing Sheets

METHOD AND SYSTEM TO ENHANCE COMPRESSION EFFICIENCY IN ENCODED VIDEO BY USING DUAL PASS ENTROPY CODING

CROSS REFERENCE TO RELATED APPLICATIONS

This application claims priority to and benefit of U.S. Provisional Patent Application No. 62/850,948, entitled "Method and System to Enhance Compression Efficiency in Encoded Video by Using Dual Pass Entropy Coding," filed on May 21, 2019, the entire contents of which are incorporated herein by reference.

FIELD

This disclosure generally relates to encoding of images and video and, in particular, to methods and systems for minimizing bit usage in encoded frames of the images or video.

BACKGROUND

For the sake of convenience, digital images and videos are referred to in the discussion below as video. Raw video data tends to be very large (on the order of several megabytes, hundreds of megabytes, etc.) and, as such, video data is rarely transmitted and/or stored in the raw form. Rather, the video is encoded and compressed. Video compression generally involves transforming raw frames of video data into a bitstream that is typically orders of magnitude smaller in size than the original raw stream, measured in bits/bytes of data, while preserving an adequate representation of the original video. Such video compression is usually lossy, and is used ubiquitously both in the storage and transmission of video data.

Many modern video encoders begin by dividing each frame of raw data into a set of processing elements or blocks, and then process these blocks in a raster-scan order. In a typical encoding pipeline for the block-based hybrid encoding model (employed in various video coding standards such as H. 264, H. 265, VP9, etc.) every frame in the video typically undergoes the following operations:

Division of pixels of the frame into blocks;
Prediction (intra-frame and/or inter-frame);
Computation of residuals after prediction, and transformation thereof to the frequency domain;
Quantization of the transformed residual values using a quantization parameter (QP); and
Entropy encoding.

Such a pipeline is often implemented using a single hardware engine or a single thread of a software process. In the prediction step, the encoder makes a prediction about a part of a current block of the frame based on parts of the video that have previously been encoded, and that closely approximates the actual pixels in the current block. Then, a difference between the actual pixels of the current block and the prediction thereof is generated, and the difference (also called an error), is encoded to obtain a compressed bitstream.

The encoders take advantage of the spatial and/or temporal redundancy typically present in video data. In general, the video information does not tend to change rapidly from frame to frame, or from pixel to pixel within a frame. Therefore, it is usually possible to find a very good prediction for the current block based on parts of the video that have been processed previously. If the prediction is good, the difference between the actual and predicted blocks (i.e., the error) can be small and, as such, the error can be represented (encoded) using much less data (in terms of bits or bytes) than that needed for encoding the actual pixel values in a block, which allows for effective compression of the video data.

Two forms of prediction are used in HEVC, VP9, and other similar encoders. The first is called inter-frame prediction, which involves looking for matching pixels in a previously encoded frame. The term motion vector (MV) describes the offset between a region to be encoded in a current frame and a corresponding region in a previously encoded frame. The second prediction method is called intra-frame prediction, which involves looking for matching pixels by projecting the values of the neighboring pixels of a current block to derive the predicted pixel values for the current block.

SUMMARY

Methods and systems for improving encoding of a picture or a frame, where the encoding is performed in two passes, are disclosed. According to one embodiment, a method for encoding video frames includes receiving for a frame, several binarized symbols that include a number of bins corresponding to one or more contexts. For each context from one or more contexts, the method includes entropy encoding in a first pass bins associated with the context using an initial probability distribution for the context; generating counts of zeros and ones in a set of bins associated with the context; updating the initial probability distribution using the respective counts of zeros and ones, to obtain an updated probability distribution; and entropy encoding in a second pass the bins associated with the context using the updated probability distribution, to provide at least a part of an encoded bitstream.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

Various embodiments described herein will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the present embodiments. In the drawings.

Figure 1:
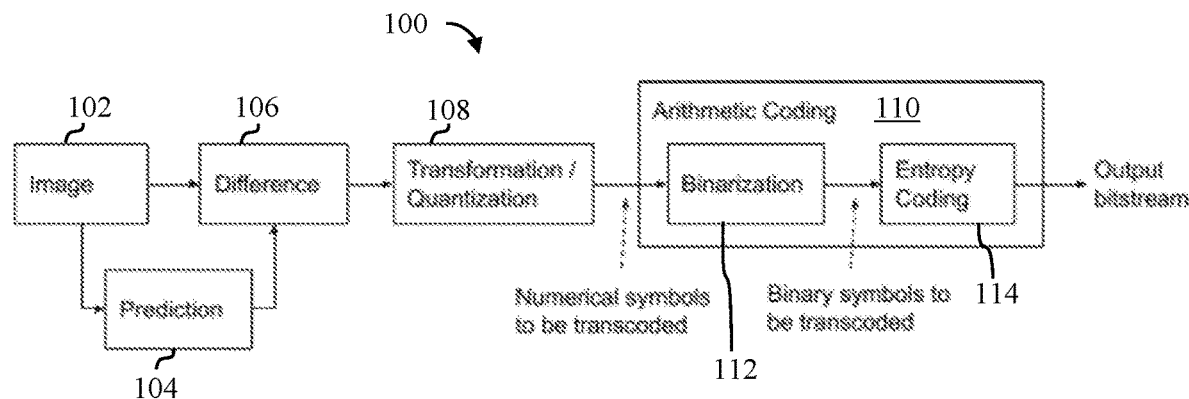
FIG. 1 is a block diagram of a generic video encoder.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

The following disclosure provides different embodiments, or examples, for implementing different features of the subject matter. Specific examples of components and arrangements are described below to simplify the present disclosure. These are, of course, merely examples and are not intended to be limiting.

Many techniques and standards for compressing video streams, either for storage on a DVD, computer disk, or other storage medium, or for broadcasting over the air, cable networks, or the Internet, rely on entropy-based variable length coding, a commonly used type of which is arithmetic coding. FIG. 1 shows a conventional video encoder 100 that may be used according to standards such as MPEG, AVC, HEVC, VP9, and AV1. The image module 102 receives frames of the video to be compressed and transmitted or stored, and partitions each frame into image blocks. Typically, though not necessarily, the image blocks are square and have sizes in pixels as 8×8; 16×16; 64×64; etc. Frames typically have sizes in pixels such as 1280×720; 1920×1080; 3840×2160; etc. The image blocks are then processed by the other modules in the system 100.

For a particular block, the prediction module 104 performs predictions via intra-frame or spatial prediction and/or via inter-frame or temporal prediction. In spatial prediction, another block in the same frame that is similar to the block being processed is identified. In temporal prediction, another block in a different, earlier or later frame, that is similar to the block being processed is identified. The prediction module 104 also selects a prediction mode as intra-frame prediction or inter-frame prediction.

A difference between the block to be processed and the corresponding predicted or reference block is computed by the difference module 106. In general, when the block-to-block change is small, the difference, also called a residual, is small. Less data is therefore required to store or transmit the residual, as opposed to storing or transmitting the whole block. Image compression can thus be achieved by storing/transmitting residuals for different blocks. During decoding, a block can be reconstructed using its associated reference block and the associated residual.

In order to achieve even further image compression, the residuals are processed further. Specifically, the computed residuals undergo a time-domain to frequency-domain transform, and the transformed residuals are quantized in the transformation/quantization module 108. The quantized and transformed residuals are generally referred to as quantized coefficients (QCs). The QCs are typically signed numbers and are provided to an arithmetic coding module 110.

Generally, the arithmetic coding module 110 performs two operations on the QCs of a frame. The binarization module 112 binarizes the QCs, which are represented as signed numbers or numerical symbols, to provide corresponding binary symbols. The binary symbols can be understood as bit sequences, also referred to as bin sequences. The binarization can be variable length or fixed length, i.e., different bit sequences corresponding to different numerical symbols can be of different lengths in variable length binarization, or all bit sequences may have the same length in fixed length binarization. Examples of binarization techniques include unary binarization, truncated unary binarization, Exp-Golomb binarization of order 0 or order 1, etc. The entropy coding module 114 receives the bin sequences and generates a compressed output bitstream for the frame. Many encoding standards, such as AVC, HEVC, etc., refer to the arithmetic coding as Content Adaptive Binary Arithmetic Coding (CABAC).

Figure 2:
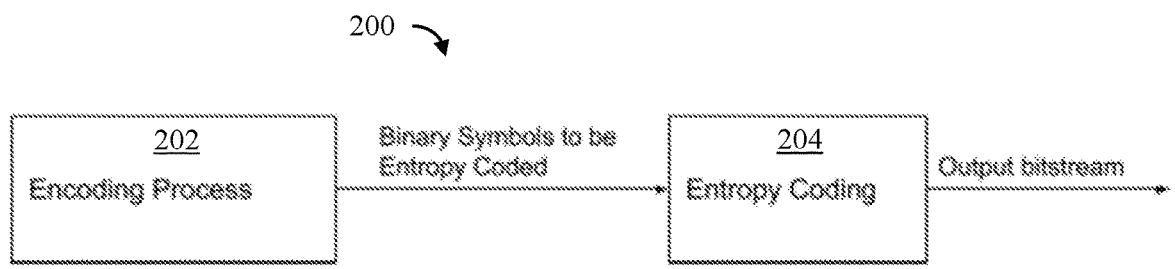
FIG. 2 describes a process of video encoding, according to some embodiments.

Logically, the processing performed by the encoder 100 can be represented as a two-part process 200 shown in FIG. 2. The encoding process (step 202) includes processing the image blocks of a frame to generate the corresponding binarized symbols, e.g., by processing the blocks of a frame as described above with reference to the modules 102-108 and 112 of FIG. 1. The output of the encoding process (step 202) is a series of binary symbols, called bins, that represent the frame. The entropy coding process (step 204) transforms these bins into a string of bits (1's and 0's) in a way that maximizes the compression efficiency.

Entropy coding is a type of variable length coding and can be generally described as representing input symbols using binary strings of different lengths. In particular, while encoding a collection of symbols the symbols that are highly probable (expected to occur frequently) are represented using fewer bits than the number of bits used to represent the symbols that are relatively less probable. This can decrease the overall bit usage, i.e., the number of bits/bytes required to encode the collection or group of symbols belonging to a frame which, in effect, can increase the compression efficiency.

In order to do so, the entropy coding process (step 204) takes into account: (1) the value of each bin to be represented in an output bitstream; (2) the meaning of each bin, i.e., what type of information does the bin represent; and (3) the distribution of probabilities of the bin taking on a value 1 or 0. The distribution probabilities indicate how frequently a bin is likely to have a particular value, i.e., 1 or 0. For example, a particular bin may be expected to take on the value of zero, and may thus have a low probability of taking on the value one.

Entropy coding (step 204) uses probability distribution for a bin type to use relatively fewer bits to represent the more likely values of a bin of that type, and uses more bits to represent a bin that takes on an unlikely value. If the input data (the binarized symbols) is not equiprobable, this scheme generally results in a net saving in terms of bit usage over a conventional technique that uses the same number of bits to represent any bin. The probability distributions (also referred to as probabilities, for simplicity) may be stored in tables, with one probability for each type of bin to be encoded.

Not only do entropy encoders take advantage of expected probabilities to reduce the bits needed to represent the bins, but also these probabilities can be adapted in some cases as the coding proceeds. This is because the values of bins obtained from the encoding process (step 202) can be highly dependent on the nature of the video that is encoded, and/or on other settings of the encoder such as the desired quality or bit rate. A fixed set of probabilities may not be sufficient to represent the different possibilities with respect to the nature of the video and encoder settings.

One way in which an entropy encoder can adapt the probabilities used is to track the value of each type of bin received for encoding. As the bin values are accumulated, statistical analysis can be used to adjust the probabilities to reflect the actual values received, under the assumption that the future bin values will likely occur as predicted by the statistics derived from the past observations. The adjusted probabilities can be used subsequently to represent a bin sequence received later using even fewer bits than those needed using the initial probabilities.

Some video encoding standards, such as AVC and HEVC, adapt the probability tables with every new bin encoded, where the updated probabilities may be used to encode the subsequent bins in encoding a frame. All the probabilities are reset to their respective default values at the start of each new frame. Other standards, such as VP9, adapt the probabilities only at the end of each frame and promote the probabilities calculated during one frame to be used in the encoding of the next frame. The VP9 encoding standard also allows the encoder to indicate explicitly some of the probabilities to be used when encoding the next frame, overriding the ones calculated automatically according to a process described above.

As noted above, many probability update techniques described above assume that the future bin values will likely occur as predicted by the statistics derived from the past observations. Should this assumption fail, the updated probabilities may not result in optimized entropy encoding and image compression. To address this problem, embodiments described herein feature a two-pass process, where the probabilities are derived by encoding a frame in a first pass, and the updated probabilities are used in a second pass, where the same frame is reencoded using the updated probabilities. In this case, the probabilities used to reencode a particular frame are not based on other, previously encoded frames; instead, they are based on the particular frame to be encoded itself.

Figure 3:
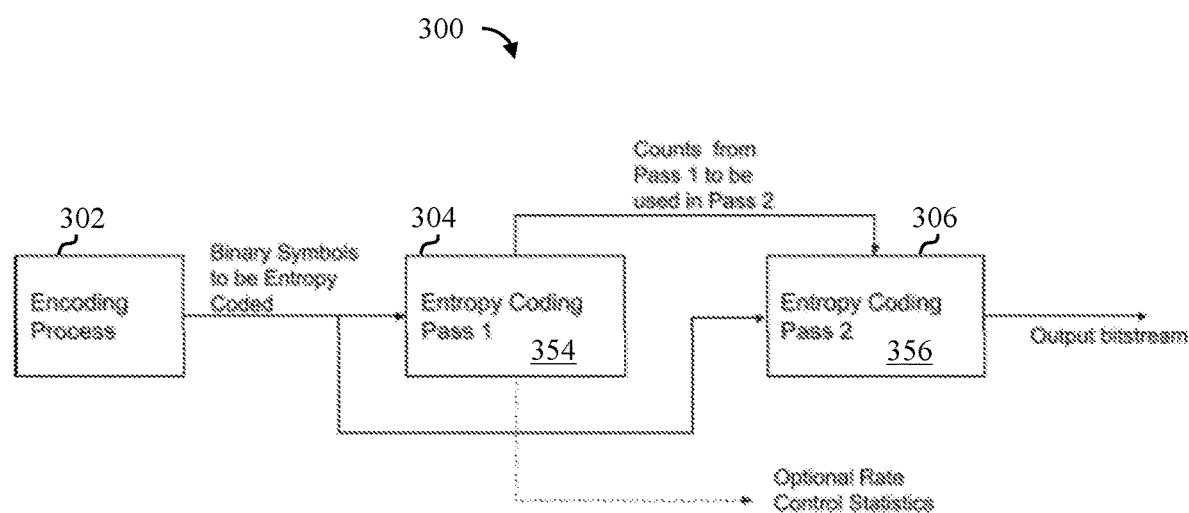
FIG. 3 illustrates a two pass entropy encoding, according to some embodiments.

FIG. 3 illustrates a two-pass process 300 and also schematically depicts a system to implement such a process, further to improve the compression efficiency of entropy coding in video codecs (coders/decoders), by customizing the entropy coding probabilities, according to some embodiments. The two-pass entropy-coding process 300 includes an encoding step 302, which is similar to the encoding process (step 202) described above with reference to FIG. 2. The encoding step 302 processes the blocks of a frame and provides binarized symbols, that are to be entropy encoded.

In step 304, a first entropy coding pass is performed to encode the bins of a frame. From this first pass, a histogram is constructed that tabulates each type of bin received, and the bin values (e.g., the number of zeros and the number of ones) associated with each type of bin. A bin type is also referred to as context. Table 1 shows an example histogram.

TABLE 1

A Histogram of Numbers of Zeros and Ones for Different Types of Bins

| Bin Type (context) | Number of 0's | Number of 1's |
|---|---|---|
| 1 | 103 | 24 |
| 2 | 2 | 500 |
| 3 | 250 | 300 |
| 4 | 1000 | 130 |
| ... | ... | ... |

The values in the histogram shown in Table 1 indicate for each bin type (context) the number of occurrences of the bin value 0 and the number of occurrences of bin value 1 that were observed while encoding a frame. The numbers in Table 1 are illustrative only. For example, in a VP9 system, some examples of different type of contexts include: is_inter prob, skip probs, segmented prob, partition prob, intra_y_mode prob, intra_uv_mode prob, etc.

Referring to FIG. 3, after the first pass, the actual bitstream that is generated is discarded because the purpose of the first pass is only to build the histogram. In some cases, the first stage simply counts the numbers of ones and zeros, rather than performing full entropy encoding. The actual bitstream that is stored and/or transmitted is generated during the second pass of entropy encoding (step 306).

In the second pass (step 306), based on the histogram obtained from the first pass (step 304), an optimized set of probabilities is determined that may result in the smallest number of bits to be used to encode the bins of the frame that was encoded in the first pass. For example, if the bins of a particular context k of a particular frame included $N0_k$ zeros and $N1_k$ ones, the context probability $p_k$ for that context in that frame can be computed as $p_k = N0_k/(N0_k + N1_k)$, when $N0_k + N1_k > 0$, i.e., the bin for context k is not empty. The optimized probabilities can be determined for one, some, or all of the contexts in the frame. During the second pass of entropy coding (step 306), the same bins are recoded, but using the updated or computed probabilities that were generated using the histograms created in the first pass (step 304). In some cases, the computation or updating of the probabilities can be performed in the first pass of entropy coding (step 304).

Image processing using the two-step entropy encoding described herein introduces a one frame delay, because each frame is first processed entirely in the first pass, and only when the first pass encoding is completed, the histograms are generated, and the context probabilities are computed, the second pass entropy coding can be performed to recode the frame.

In some embodiments, however, the throughput of the overall image processing (encoding) pipeline is not affected by using two entropy encoders connected in series. In this configuration, while the second entropy encoder (shown in FIG. 3 as entropy encoder 356) reencodes a frame F_n, the first entropy encoder 354 can encode the next frame F_(n+1), generate a histogram thereof, and compute the probabilities for the next frame. Subsequently, when the first entropy encoder 354 encodes the frame following the frame F_(n+1), i.e., the frame F_(n+2), the second entropy encoder 356 can reencode the frame F_(n+1). If the frame F_(n+1) is the current frame, the frame F_n is the previous frame, and frame F_(n+2) is the next frame. The entropy encoders 354, 356 can simultaneously (e.g., at least partially overlapping in time) process the current and the previous frames, respectively.

Thus, in each cycle, a new frame can be processed, and the overall rate at which the two-step entropy encoding process 300 can process frames is not affected, which is beneficial to real time video encoding. Some embodiment may use only a single entropy encoder, however, in which case the throughput can decrease by a factor of two.

Some embodiments of the two-step entropy encoding process can assist with rate control. Rate control is a mechanism by which an encoder regulates the bit rate of the generated bitstream by trading off encoding quality with the number of bits used to encode a frame. For example, if a bit rate of 1 megabits per second (Mbps) is the target bit rate, the rate control mechanism keeps track of the actual bit rate as bits are generated by the entropy coding module 114 (FIG. 1) or by the second entropy encoding process 306 (FIG. 3), and adjusts the encoding quality to be higher or lower, as required, so that the actual bit rate is approximately equal to (e.g., within 0.5%, 1%, 5%, 12%, 25%, etc. of) the target bit rate of 1 Mbps.

To adjust the encoding quality, the rate control mechanism can set or adjust quantization parameters (QP) for each picture/frame, which controls the quantization of transformed residuals and, thus, the size and quality of the encoded frames, so that the target bit rate can be matched as described above. In a constant target bitrate scenario, the rate control mechanism may create a video buffering verifier (VBV) that models the expected level of a picture/frame buffer at the decoder as a function of the transmission bandwidth, size of the buffer at the decoder, and the total size of a selected number of previously encoded pictures/frames.

Using the VBV model, the rate control mechanism can evaluate the expected VBV level assuming that the current and next N frames will be encoded using the current QP. To determine the expected VBV level, the rate control mechanism uses the estimated size (in bits or bytes) of the current frame as encoded, which can be used to estimate the sizes of the next N frames as encoded, where N can be any number such as 1, 2, 5, 8, 12, 16, etc. Based on the expected level of the VBV, the rate control mechanism can choose a QP that maximizes the bit rate without allowing the VBV to overflow.

Some rate control algorithms receive a feedback from the entropy coding module (e.g., the module 114 shown in FIG. 1) as to how many bits were actually used in an encoded frame. It is important to obtain this information quickly, so that encoding of the subsequent frames may be adjusted as soon as possible to compensate for any expected overshoot or undershoot in the target bit rate. Therefore, before encoding the next picture/frame, in some cases the rate control mechanism receives the actual size of the current picture/frame as it is encoded. Using the actual encoded size, the rate control mechanism can adjust its estimation model to estimate the encoded sizes of the next or future N pictures/frames.

In general, as a feedback control system, the rate control mechanism is generally sensitive to delays in receiving estimated picture/frame size feedback from the entropy module (e.g., the module 114 in FIG. 1). It is therefore advantageous to receive picture/frame size immediately after a picture/frame is encoded. Referring to FIG. 3, in the two-step encoding process 300, however, the actual frame/picture size or the accurate bit count of an encoded picture/frame becomes available after a delay corresponding to the encoding time for a frame, referred to as frame-encoding delay, because the actual size becomes available only after the second pass 306.

To avoid this delay, in some embodiments, an approximate number of bits used per encoded frame, i.e., an approximate or estimated size (in bits or bytes) of an encoded picture/frame is obtained from the first pass 304 of the process 300. The estimated size may not be perfectly accurate, i.e., the actual size of the encoded frame, which can be determined after the second pass 306 of the encoding process 300, may be different from the estimated size. Nevertheless, the estimated size may be accurate enough, i.e., the difference between the actual and estimated sizes may not exceed a certain specified threshold (e.g., 1%, 5%, 10%, 25%, etc., of the actual or estimated size).

Advantageously, the estimated size becomes available after the first pass 304, without incurring a frame-encoding delay. The estimated size can be supplied to the rate control mechanism, so that it can adjust the quantization parameter (QP) as needed, as described above. The rate control mechanism may optionally use the final, accurate frame size from the second pass 306 as well, to refine the QP.

In some embodiment of the two-step process 300, the first and second entropy encoders 354, 356 are incorporated into video encoders based on various standards such as VP9, that feature real time encoding. Real time encoders are generally understood as encoders that can encode a live video stream, as it is received by the encoder. Examples include live broadcasts, surveillance video, video conferences, live streaming on the Internet, etc.

In video codecs (encoders/decoders) that support providing custom entropy coding probabilities to encode a bitstream, the first entropy encoder 354 may perform the first pass 304 of the overall entropy coding, and may count the occurrences of different types of bins (contexts) and the different values, i.e., the numbers of zeros and ones. The second entropy encoder 356 may recode the bins after the probabilities for use in the second pass 306 are updated using the bin counts produced in the first pass 304. Either or both of the two encoders 354, 356 may be implemented in hardware, e.g., as an application specific integrated circuit (ASIC) or as a field programmable gate array (FPGA); in software; or using both software and hardware components. Together, the two encoders 354, 356 can form a real-time encoder that may encode video as it is received. The first entropy encoder 354 may produce estimated frame size, in bits or bytes, for use by a rate control mechanism as described above. Providing an initial estimated frame size without incurring a frame-encoding delay can lead to a robust rate control.

Figure 4:
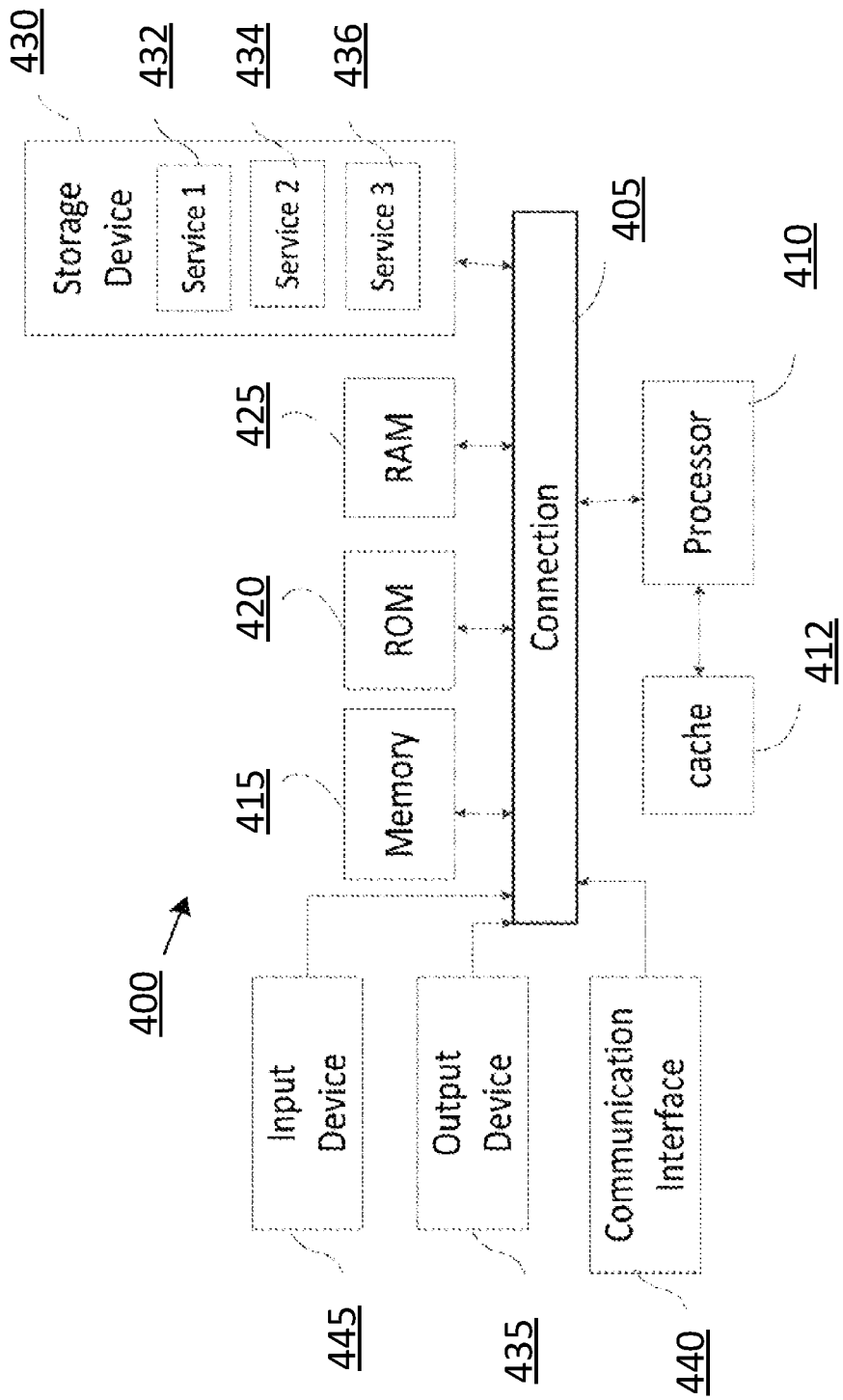
FIG. 4 illustrates an exemplary computing system, according to one embodiment.

FIG. 4 illustrates an exemplary computing system 400 in which the components of the system are in communication with each other using connection 405. Computing system 400 can be, for example, a computing system of a server, PC, tablet and/or mobile device, in which a processor, field programmable gate array (FPGA), or other programmable processing device performs the processes described above. While these devices have some components in common, such as those exemplified above, it should be appreciated that each of the server, PC, tablet and/or mobile device are specialized devices configured for their specific purposes. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a data center, multiple datacenters, a peer network, etc. In some embodiments, one or more of the described system components represents many such components each performing some or all of the function for which the component is described. In some embodiments, the components can be physical or virtual devices.

Exemplary computing system 400 includes at least one processing unit (CPU, FPGA, or processor) 410 and connection 405 that couples various system components including system memory 415, such as read only memory (ROM) and random access memory (RAM) to processor 410. Computing system 400 can include a cache of high-speed memory connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMS), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory or transitory computer-readable medium.

In some embodiments the computer-readable storage devices, mediums, and memories can include a cable or wireless signal containing a bit stream and the like. However, when mentioned, transitory computer-readable storage media are media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A method for encoding video frames, the method comprising:
  receiving for a frame, a plurality of binarized symbols comprising a plurality of bins corresponding to one or more contexts;

for each context from the one or more contexts:
entropy encoding in a first pass a set of bins associated with the context using an initial probability distribution for the context;
generating counts of zeros and ones in a set of bin types associated with the context based on the entropy encoding the set of bins in the first pass;
updating the initial probability distribution using the respective counts of zeros and ones, to obtain an updated probability distribution; and
entropy encoding in a second pass the set of bins associated with the context using the updated probability distribution, to provide at least a part of an encoded bitstream.

2. The method of claim 1, wherein:
the step of entropy encoding in the first pass is performed by a first entropy encoder for a current frame; and
the step of entropy encoding in the second pass is performed simultaneously by a second entropy encoder for a previous frame.

3. The method of claim 1, wherein a size in pixels of the frame is 1280×720, 1920×1080, or 3840×2160.

4. The method of claim 1, wherein the step of entropy encoding in the first pass and the step of entropy encoding in the second pass are incorporated within a standardized encoding process.

5. The method of claim 4, wherein the standardized encoding process is selected from a group consisting of HEVC, VP9, and AV1.

6. The method of claim 1, wherein the step of entropy encoding in the first pass and the step of entropy encoding in the second pass are incorporated within a real-time encoding process.

7. The method of claim 1, further comprising:
estimating in the step of entropy encoding in the first pass a size in bits or bytes of the frame upon encoding thereof; and
supplying the estimated size of the frame to a rate control mechanism.

8. The method of claim 7, further comprising:
supplying in the step of entropy encoding in the second pass an actual size in bits or bytes of the frame, upon encoding thereof, to a rate control mechanism.

9. The method of claim 7, further comprising:
adjusting by the rate control mechanism a quantization parameter for encoding subsequent frames using the estimated size of the frame.

10. The method of claim 1, wherein the step of entropy encoding in the first pass and the step of entropy encoding in the second pass are performed sequentially using a single entropy encoder.

11. A system for encoding video frames, comprising:
a processor; and
a memory in communication with the processor and comprising instructions which, when executed by the processor, program the processor to:
receive for a frame, a plurality of binarized symbols comprising a plurality of bins corresponding to one or more contexts;
for each context from the one or more contexts:
initiate entropy encoding in a first pass a set of bins associated with the context using an initial probability distribution for the context;
obtain counts of zeros and ones in a set of bin types associated with the context based on the entropy encoding the set of bins in the first pass;
update the initial probability distribution using the respective counts of zeros and ones, to obtain an updated probability distribution; and
initiate entropy encoding in a second pass the set of the bins associated with the context using the updated probability distribution, for providing at least a part of an encoded bitstream.

12. The system of claim 11, further comprising:
a first entropy encoder that is initiated by the processor to perform entropy encoding in the first pass for a current frame; and
a second entropy encoder this is initiated by the processor to perform entropy encoding in the second pass simultaneously for a previous frame.

13. The system of claim 12, wherein the instructions further program:
the processor to operate as the first encoder or the second encoder; or
another, different processor to operate as the second encoder or the first encoder.

14. The system of claim 12, wherein the first encoder or the second encoder comprises a field programmable gate array (FPGA) based processor.

15. The system of claim 11, wherein a size in pixels of the frame is 1280×720, 1920×1080, or 3840×2160.

16. The system of claim 11, wherein the instructions further program the processor to perform one or more additional operations of a standardized encoding process.

17. The system of claim 11, wherein the processor is in communication with and integrated with an image compression system adapted to implement one or more operations of a standardized encoding process.

18. The system of claim 17, wherein the standardized encoding process is selected from a group consisting of HEVC, VP9, and AV1.

19. The system of claim 11, wherein the processor is included within a real-time encoding system.

20. The system of claim 11, wherein the instructions further program the processor to:
estimate during the operation entropy encode in the first pass a size in bits or bytes of the frame upon encoding thereof; and
supply the estimated size of the frame to a rate control mechanism.

21. The system of claim 20, wherein the instructions further program the processor to:
supply during the operation entropy encode in the second pass an actual size in bits or bytes of the frame, upon encoding thereof, to a rate control mechanism.

22. The system of claim 20, further comprising:
the rate control mechanism configured to adjust a quantization parameter for encoding subsequent frames using the estimated size of the frame.

23. The system of claim 11, further comprising:
a single entropy encoder configured to perform sequentially both operations: (i) entropy encode in the first pass and (ii) entropy encode in the second pass.

24. The system of claim 23, wherein the instructions program the processor or another processor to operate as the single entropy encoder.

* * * * *